July 1, 1924.

B. T. WILLISTON ET AL 1,499,432

ROD SECURING MEANS

Filed June 2, 1921

Inventor
Belvin T. Williston
Howard E. Eddy.
By Roberts, Roberts & Cushman
Attorneys Patented July 1, 1924.

1,499,432

UNITED STATES PATENT OFFICE.

BELVIN T. WILLISTON, OF SOMERVILLE, MASSACHUSETTS, AND HOWARD E. EDDY, OF EAST ORANGE, NEW JERSEY, ASSIGNORS TO MANNING, MAXWELL & MOORE, INC., OF NEW YORK, N. Y., A CORPORATION OF NEW JERSEY.

ROD-SECURING MEANS.

Application filed June 2, 1921. Serial No. 474,446.

*To all whom it may concern:*

Be it known that we, BELVIN T. WILLISTON and HOWARD E. EDDY, citizens of the United States of America, and residents of Somerville and East Orange, in the counties of Middlesex and Essex and States of Massachusetts and New Jersey, respectively, have invented new and useful Improvements in Rod-Securing Means, of which the following is a specification.

This invention relates to means whereby associated mechanical parts may be secured together in fixed relation and is especially directed to the provision of means whereby the end of a torsion rod may be fastened to another part rotatable therewith.

When for example, a torsion rod or shaft is connected to one element of a universal joint, either for driving such element or to receive motion therefrom, it is difficult to provide for securing such rod and element together in a manner which will effectively resist any tendency of the parts to move relatively one to the other under the constantly varying rotational and longitudinal stresses occurring at the point of connection. When a device of this character is employed in a mechanism wherein it is subject to frequent and heavy vibrations such difficulty in providing a proper connection between the parts is greatly increased.

The present invention may be considered to be an improvement upon that disclosed in the patent to Williston, No. 1,121,962, December 22, 1914. In the patented device, the shaft or rod is provided with a squared extremity engageable with a square opening in the associated part and while very efficient for the desired purpose under ordinary circumstances, it is found that the parts have a tendency to become loose when subjected to extensive and long continued vibration.

The present invention has for its object the provision of attaching means whereby such a torsion rod may be connected to its associated part in a firm and secure manner and by the use of simple devices so constructed and arranged as to be substantially unaffected by vibrations or rapidly varying stresses.

As one means of carrying the above object into effect, the arrangement illustrated in the accompanying drawings may be employed, and in which drawings—

Figure 1:
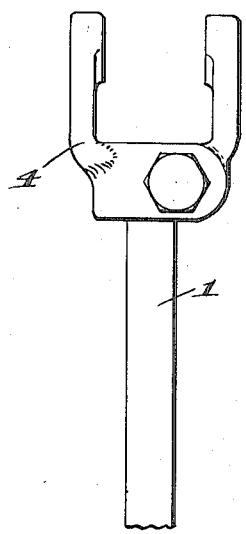
Figure 1 is a side elevation of the end portion of a torsion rod secured to one element of a universal joint by the means forming the subject matter of this application.
Figure 3:
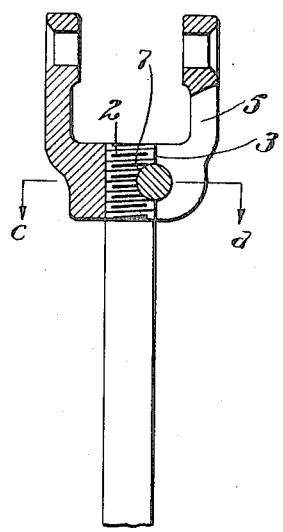
Figure 3 is a longitudinal cross section on a line such as *a—b* of Fig. 2.
Figure 2:
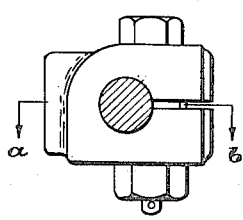
Figure 2 is a bottom plan view of the device as indicated at Fig. 1.
Figure 4:
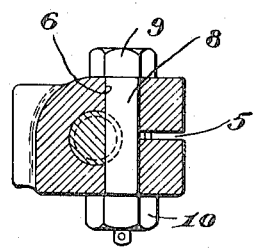
Figure 4 is a transverse cross section on the line *c—d* of Fig. 3.

A shaft or torsion rod is indicated at 1, it being understood that such shaft may be of any desired length, a fragmentary portion only being indicated herein. The end of this shaft is externally screw-threaded as indicated at 2, such screw-threaded portion engaging within an internally screw-threaded opening 3 in the associated part 4, such part being illustrated herein as constituting an element of a universal joint, the other elements of such joint not being illustrated. The part 4 is provided with a slot 5, at one side thereof, such slot extending longitudinally of the screw-threaded opening in such part and intersecting the same. The part 4 is also provided with an opening 6 which extends transversely across the screw-threaded opening therein and at that side of the axis of such opening at which the aforesaid slot is located. The screw-threaded portion of the rod 1 is provided with a groove or a notch 7 which aligns with the opening 6 when such rod has been properly engaged with the threaded opening in the part 4. This groove or notch provides a passage transversely across the rod 1 with which engages a bolt 8, such bolt passing through the opening 6 in the part 4. The bolt 8 is provided with a head 9 at one end and is screw-threaded at its opposite end for engagement by a nut 10. In accordance with the preferred mode of assembling the parts, the rod 1 will first be screwed into the threaded opening 3 in the part 4 and then the transverse opening 6 will be drilled through the part 4, the notch or groove 7 in the rod 1 thus being simultaneously formed, assuring its alignment with the adjacent parts of the opening 6. The bolt 8 is now inserted into opening 6, passing through the notch 7 and engaging the wall thereof, and the nut 10 is now placed upon the end of the bolt and tightened. This serves to draw the slotted portion of the part 4 together, thereby pinching the walls of the threaded opening tightly against the external threads of the rod 1, thus serving in a very effective manner to secure the parts together. The bolt 8 also, by reason of its engagement with the wall of the notch 7, serves in a positive manner to prevent rotation of the rod 1 relative to the part 4. The parts 1 and 4 are thus secured together in a very firm and efficient manner, and there is little tendency for the parts to become loose when subjected to rapid stress and vibration, even though the nut 10 should be partially unscrewed.

Having thus described the invention in a preferred embodiment of the same, together with the manner of associating the various parts concerned therein, what we claim and desire to secure by Letters Patent of the United States is:

A device of the class described comprising a member constituting an element of a universal joint, said member having a part provided with an internally threaded circular bore and having a slot extending from the bore to its outer surface, the slot extending longitudinally of the bore, a torsion rod having a threaded extremity engaging the threaded bore in said part, and a binding bolt extending through said part transversely to the slot therein for drawing the opposite walls of the slot together to bind the rod in the threaded bore, said binding bolt engaging a notch in the circumferential surface of the threaded end of the rod positively to prevent rotation of the latter relatively to the part having the threaded bore.

Signed by us at Boston, Massachusetts, this 31st day of May, 1921, and at New York, New York, this fourteenth day of May, 1921.

BELVIN T. WILLISTON.
HOWARD E. EDDY.